US012016090B2

(12) United States Patent
Lipowicz

(10) Patent No.: US 12,016,090 B2
(45) **Date of Patent: *Jun. 18, 2024**

(54) ELECTRONIC VAPING DEVICE

(71) Applicant: Altria Client Services LLC, Richmond, VA (US)

(72) Inventor: Peter Lipowicz, Midlothian, VA (US)

(73) Assignee: ALTRIA CLIENT SERVICES LLC, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/057,277

(22) Filed: Nov. 21, 2022

(65) Prior Publication Data

US 2023/0083419 A1 Mar. 16, 2023

Related U.S. Application Data

(63) Continuation of application No. 16/390,397, filed on Apr. 22, 2019, now Pat. No. 11,540,359, which is a (Continued)

(51) Int. Cl.
*H05B 3/26* (2006.01)
*A24F 40/10* (2020.01)
(Continued)

(52) U.S. Cl.
CPC ............. *H05B 3/265* (2013.01); *A24F 40/44* (2020.01); *A24F 40/46* (2020.01); *B65D 1/44* (2013.01);
(Continued)

(58) Field of Classification Search
None
See application file for complete search history.

(56) References Cited

U.S. PATENT DOCUMENTS 2,104,266 A 1/1938 McCormick
2,905,447 A * 9/1959 Huet ....................... F28F 13/06 165/172

(Continued)

FOREIGN PATENT DOCUMENTS

CN 101228969 A 7/2008
CN 201375023 Y 1/2010

(Continued)

OTHER PUBLICATIONS

International Search Report and Written Opinion for corresponding International Application No. PCT/EP2017/056732 dated May 31, 2017.

(Continued)

*Primary Examiner* — Thor S Campbell
(74) *Attorney, Agent, or Firm* — Harness, Dickey & Pierce, P.L.C.

(57) ABSTRACT

An electronic vaping device includes a housing, a planar heater, a heater support, a tank, and a wick. The housing extends in a longitudinal direction and has a tip end and a mouth-end. The tip end is closed and the mouth-end has an opening therein. The heater support supports the planar heater. The tank contains a pre-vapor formulation and is configured to slide into and out of the opening of the mouth-end of the housing. The wick extends from the tank and is configured to be in contact with the planar heater when the tank is inserted in the housing.

20 Claims, 10 Drawing Sheets

Related U.S. Application Data continuation of application No. 15/075,588, filed on Mar. 21, 2016, now Pat. No. 10,264,821.

(51) Int. Cl.

| | |
|---|---|
| ***A24F 40/44*** | (2020.01) |
| ***A24F 40/46*** | (2020.01) |
| ***B65D 1/44*** | (2006.01) |
| ***B67D 7/00*** | (2010.01) |
| ***H05B 1/02*** | (2006.01) |

(52) U.S. Cl.

CPC ............. *B67D 7/00* (2013.01); *H05B 1/0297* (2013.01); *H05B 3/26* (2013.01); *A24F 40/10* (2020.01); *H05B 2203/003* (2013.01)

(56) References Cited

U.S. PATENT DOCUMENTS 5,111,740 A 5/1992 Klein
5,573,692 A 11/1996 Das et al.
5,665,262 A 9/1997 Hajaligol et al.
6,155,268 A 12/2000 Takeuchi
8,156,944 B2 4/2012 Han
8,499,766 B1 * 8/2013 Newton .................. A24F 40/51 131/273
8,528,569 B1 9/2013 Newton
8,550,068 B2 10/2013 Terry et al.
8,689,805 B2 4/2014 Hon
8,707,965 B2 4/2014 Newton
8,955,522 B1 2/2015 Bowen et al.
9,004,073 B2 4/2015 Tucker et al.
9,198,466 B2 * 12/2015 Liu ......................... A24F 40/42
9,516,971 B2 * 12/2016 Klein .................... A47J 31/542
9,603,386 B2 * 3/2017 Xiang ..................... A24F 40/50
9,675,114 B2 * 6/2017 Timmermans .......... A24F 40/60
9,808,032 B2 * 11/2017 Yamada ............... A61M 11/042
10,132,525 B2 * 11/2018 Klein ...................... F24H 1/102
10,264,821 B2 * 4/2019 Lipowicz ................ A24F 40/44
11,540,359 B2 * 12/2022 Lipowicz ............... H05B 3/265
2004/0035409 A1 2/2004 Harwig et al.
2007/0283972 A1 * 12/2007 Monsees ................... F23Q 2/32 131/273
2009/0095287 A1 * 4/2009 Emarlou ............... A61M 15/06 128/200.14
2009/0095297 A1 4/2009 Hallett
2009/0230117 A1 9/2009 Fernando et al.
2009/0272379 A1 11/2009 Thorens et al.
2010/0313901 A1 * 12/2010 Fernando ........... B65D 85/1081 131/330
2011/0036346 A1 * 2/2011 Cohen ..................... A24F 40/60 128/200.14
2011/0126848 A1 6/2011 Zuber et al.
2011/0155718 A1 6/2011 Greim et al.
2011/0277760 A1 11/2011 Terry et al.
2012/0048266 A1 * 3/2012 Alelov ................ A61M 15/008 128/203.14
2012/0273589 A1 11/2012 Hon
2012/0285475 A1 11/2012 Liu
2013/0042865 A1 * 2/2013 Monsees ................. A24F 40/53 128/203.27
2013/0081642 A1 4/2013 Safari
2013/0104916 A1 * 5/2013 Bellinger ............. A61M 11/042 131/328
2013/0192623 A1 8/2013 Tucker et al.
2013/0276798 A1 10/2013 Hon
2013/0276804 A1 10/2013 Hon
2013/0284192 A1 * 10/2013 Peleg ...................... A24F 40/53 131/329
2013/0298905 A1 11/2013 Levin et al.
2013/0319440 A1 * 12/2013 Capuano ................. A24F 40/50 131/329
2013/0340775 A1 * 12/2013 Juster .................. H04L 12/1827 131/273
2014/0007863 A1 1/2014 Chen
2014/0007891 A1 1/2014 Liu
2014/0053856 A1 * 2/2014 Liu ......................... A24F 40/51 131/329
2014/0060554 A1 3/2014 Collett et al.
2014/0064715 A1 3/2014 Greim et al.
2014/0076310 A1 3/2014 Newton
2014/0107815 A1 * 4/2014 LaMothe ................ A24F 15/01 700/90
2014/0123989 A1 * 5/2014 LaMothe .......... A61M 15/0003 131/328
2014/0123990 A1 * 5/2014 Timmermans .......... A24F 40/60 131/328
2014/0130796 A1 5/2014 Liu
2014/0130816 A1 5/2014 Liu
2014/0150785 A1 6/2014 Malik et al.
2014/0174459 A1 * 6/2014 Burstyn .................. A24F 40/60 131/273
2014/0182610 A1 7/2014 Liu
2014/0246035 A1 * 9/2014 Minskoff ................ A24F 40/65 131/329
2014/0251324 A1 * 9/2014 Xiang ..................... A24F 40/50 128/202.21
2014/0261490 A1 9/2014 Kane
2014/0283859 A1 9/2014 Minskoff et al.
2014/0305820 A1 * 10/2014 Xiang ..................... A24F 40/95 206/236
2014/0334804 A1 * 11/2014 Choi ..................... A24F 40/485 392/404
2014/0360512 A1 * 12/2014 Xiang ..................... A24F 40/50 131/328
2014/0360517 A1 12/2014 Taggart et al.
2015/0020833 A1 1/2015 Conley et al.
2015/0034108 A1 2/2015 Newton
2015/0047662 A1 * 2/2015 Hopps ................... A61M 15/06 392/394
2015/0053217 A1 * 2/2015 Steingraber ............. A24F 40/50 131/329
2015/0075546 A1 * 3/2015 Kueny, Sr. .............. A24F 40/65 700/299
2015/0086186 A1 3/2015 Boki
2015/0122252 A1 * 5/2015 Frija ....................... A24F 40/65 128/202.21
2015/0173124 A1 * 6/2015 Qiu ......................... A24F 40/60 131/328
2015/0224268 A1 * 8/2015 Henry .................... G06Q 50/01 128/202.21
2015/0237917 A1 * 8/2015 Lord ....................... G01L 19/04 131/328
2015/0245661 A1 * 9/2015 Milin ...................... A24F 40/40 131/329
2015/0245669 A1 9/2015 Cadieux et al.
2015/0257445 A1 * 9/2015 Henry, Jr. ............... A24F 40/50 131/328
2015/0257448 A1 * 9/2015 Lord .................... H05B 1/0244 700/90
2015/0258289 A1 * 9/2015 Henry, Jr. ............... A24F 40/50 128/202.21
2015/0288468 A1 * 10/2015 Xiang ..................... A24F 40/65 455/500
2015/0351456 A1 12/2015 Johnson et al.
2015/0357839 A1 * 12/2015 Cai ......................... A24F 40/53 131/329
2015/0359263 A1 * 12/2015 Bellinger ............. H05B 1/0244 392/394
2016/0007651 A1 * 1/2016 Ampolini ................ A24F 40/65 131/328
2016/0021930 A1 * 1/2016 Minskoff ................ A24F 40/51 392/395
2016/0021934 A1 1/2016 Cadieux et al.
2016/0106156 A1 * 4/2016 Qiu ......................... A24F 40/53 392/404
2016/0219938 A1 * 8/2016 Mamoun ................ G05B 15/02
2016/0285983 A1 * 9/2016 Liu ........................ G16H 40/67
2016/0331024 A1 * 11/2016 Cameron ................ A24F 40/50
2016/0331026 A1 * 11/2016 Cameron ................ A24F 40/50
2016/0331027 A1 * 11/2016 Cameron ................ B05B 15/40

(56) References Cited

U.S. PATENT DOCUMENTS

| | | | | |
|---|---|---|---|---|
| 2016/0331035 | A1* | 11/2016 | Cameron | H04M 1/21 |
| 2016/0331859 | A1* | 11/2016 | Cameron | A24F 40/51 |
| 2016/0337362 | A1* | 11/2016 | Cameron | G06Q 20/3278 |
| 2016/0338407 | A1* | 11/2016 | Kerdemelidis | A24F 40/60 |
| 2016/0345628 | A1* | 12/2016 | Sabet | H04M 1/21 |
| 2016/0360786 | A1* | 12/2016 | Bellinger | A24F 40/46 |
| 2016/0363917 | A1* | 12/2016 | Blackley | G06F 3/0488 |
| 2016/0374401 | A1* | 12/2016 | Liu | A24F 40/50 131/328 |
| 2017/0042230 | A1* | 2/2017 | Cameron | A24F 40/60 |
| 2017/0042231 | A1* | 2/2017 | Cameron | A24F 40/65 |
| 2017/0045994 | A1* | 2/2017 | Murison | H02J 7/342 |
| 2017/0046357 | A1* | 2/2017 | Cameron | A24F 40/30 |
| 2017/0046738 | A1* | 2/2017 | Cameron | A24F 40/65 |
| 2017/0055588 | A1* | 3/2017 | Cameron | A61M 15/06 |
| 2017/0064999 | A1* | 3/2017 | Perez | A24F 40/40 |
| 2017/0079327 | A1* | 3/2017 | Wu | H05B 1/0244 |
| 2017/0079329 | A1* | 3/2017 | Zitzke | H05B 1/0225 |
| 2017/0086496 | A1* | 3/2017 | Cameron | B25F 1/04 |
| 2017/0086497 | A1* | 3/2017 | Cameron | H05B 1/0244 |
| 2017/0086503 | A1* | 3/2017 | Cameron | A24F 40/90 |
| 2017/0086504 | A1* | 3/2017 | Cameron | A24F 40/48 |
| 2017/0086505 | A1* | 3/2017 | Cameron | H01L 29/78693 |
| 2017/0086507 | A1* | 3/2017 | Rado | H05B 3/44 |
| 2017/0091490 | A1* | 3/2017 | Cameron | G06F 21/84 |
| 2017/0092106 | A1* | 3/2017 | Cameron | A24F 40/65 |
| 2017/0093960 | A1* | 3/2017 | Cameron | H04W 4/80 |
| 2017/0093981 | A1* | 3/2017 | Cameron | A24F 40/65 |
| 2017/0119058 | A1* | 5/2017 | Cameron | A24B 15/167 |
| 2017/0127727 | A1* | 5/2017 | Davidson | A61P 13/10 |
| 2017/0135400 | A1* | 5/2017 | Liu | A24F 40/53 |
| 2017/0135407 | A1* | 5/2017 | Cameron | A24F 40/60 |
| 2017/0135408 | A1* | 5/2017 | Cameron | A24F 40/51 |
| 2017/0135409 | A1* | 5/2017 | Cameron | A24F 1/02 |
| 2017/0135410 | A1* | 5/2017 | Cameron | H01M 10/44 |
| 2017/0135411 | A1* | 5/2017 | Cameron | A24F 40/50 |
| 2017/0135412 | A1* | 5/2017 | Cameron | A24F 40/51 |
| 2017/0136193 | A1* | 5/2017 | Cameron | A24F 40/48 |
| 2017/0136194 | A1* | 5/2017 | Cameron | A24F 40/05 |
| 2017/0136301 | A1* | 5/2017 | Cameron | A24F 40/65 |
| 2017/0143917 | A1* | 5/2017 | Cohen | A24F 40/40 |
| 2017/0150756 | A1* | 6/2017 | Rexroad | H05B 1/0244 |
| 2017/0157341 | A1* | 6/2017 | Pandya | A61M 15/009 |
| 2017/0181467 | A1* | 6/2017 | Cameron | A63F 13/98 |
| 2017/0181474 | A1* | 6/2017 | Cameron | A24B 15/167 |
| 2017/0181475 | A1* | 6/2017 | Cameron | A24F 40/53 |
| 2017/0185364 | A1* | 6/2017 | Cameron | G09G 5/12 |
| 2017/0196270 | A1* | 7/2017 | Vick | H02J 7/0042 |
| 2017/0208867 | A1* | 7/2017 | Li | G08C 17/02 |
| 2017/0215480 | A1* | 8/2017 | Qiu | A24F 40/65 |
| 2017/0224020 | A1* | 8/2017 | Fernando | H02J 7/0013 |
| 2017/0231280 | A1* | 8/2017 | Anton | A24F 40/65 392/404 |
| 2017/0245550 | A1* | 8/2017 | Freelander | A61M 15/0051 |
| 2017/0245554 | A1* | 8/2017 | Perez | H05B 1/0244 |
| 2017/0258136 | A1* | 9/2017 | Hawes | A24F 40/53 |
| 2017/0258142 | A1* | 9/2017 | Hatton | H05B 1/0244 |
| 2017/0259170 | A1* | 9/2017 | Bowen | A24F 40/60 |
| 2017/0273357 | A1* | 9/2017 | Barbuck | H05B 3/04 |
| 2017/0280778 | A1 | 10/2017 | Force | |
| 2017/0280779 | A1* | 10/2017 | Qiu | G05D 23/1919 |
| 2017/0290998 | A1* | 10/2017 | Poston | A61M 11/047 |
| 2017/0295844 | A1* | 10/2017 | Thevenaz | A24F 40/46 |
| 2017/0303590 | A1* | 10/2017 | Cameron | A24F 40/00 |
| 2017/0303593 | A1* | 10/2017 | Cameron | A24F 40/60 |
| 2017/0303594 | A1* | 10/2017 | Cameron | A61M 15/00 |
| 2017/0309091 | A1* | 10/2017 | Cameron | G07C 5/085 |
| 2017/0332702 | A1* | 11/2017 | Cameron | A24F 40/65 |
| 2017/0360092 | A1 | 12/2017 | Althorpe et al. | |
| 2017/0367407 | A1* | 12/2017 | Althorpe | A24F 40/40 |
| 2018/0020735 | A1 | 1/2018 | Bilat et al. | |
| 2019/0373949 | A1* | 12/2019 | Pan | A24F 40/44 |

FOREIGN PATENT DOCUMENTS

| | | | |
|---|---|---|---|
| CN | 202407082 | U | 9/2012 |
| CN | 203633510 | U | 6/2014 |
| CN | 103974640 | A | 8/2014 |
| CN | 104720120 | A | 6/2015 |
| CN | 104768407 | A | 7/2015 |
| CN | 205492620 | U | 8/2016 |
| DE | 202015006397 | U1 | 12/2015 |
| EP | 0845220 | A1 | 6/1998 |
| EP | 2316286 | A1 | 5/2011 |
| EP | 2340729 | A1 | 7/2011 |
| JP | 2013-509160 | A | 3/2013 |
| JP | 2013-516159 | A | 5/2013 |
| JP | 2015-532828 | A | 11/2015 |
| JP | 2017506915 | A | 3/2017 |
| JP | 2017-533726 | A | 11/2017 |
| WO | WO-2013/083635 | A1 | 6/2013 |
| WO | WO-2014198157 | A1 | 12/2014 |
| WO | WO-2015042412 | A1 | 3/2015 |
| WO | WO-2016/014652 | A1 | 1/2016 |

OTHER PUBLICATIONS

Russian Notice of Allowance and Search Report for corresponding Application No. 2018131108, dated Jun. 17, 2020.

Chinese Office Action dated Dec. 2, 2020 for corresponding Chinese Application No. 201780013762.7, and English-language translation thereof.

Office Action dated Mar. 11, 2021 issued in corresponding Japanese Patent Application No. 2018-549911.

Korean Office Actioin dated Nov. 17, 2021 for corresponding Korean Application No. 10-2018-7026140, and English-language translation thereof.

Korean Notice of Allowance dated May 25, 2022 for corresponding Korean Application No. 2018-7026140, and English-language translation thereof.

Japanese Office Action dated Jul. 6, 2022 for corresponding Japanese Application No. 2018-549911, and English-language translation thereof.

* cited by examiner

ELECTRONIC VAPING DEVICE

CROSS-REFERENCE TO RELATED APPLICATION(S)

This application is a Continuation application of U.S. application Ser. No. 16/390,397, filed Apr. 22, 2019, which is a Continuation application of U.S. application Ser. No. 15/075,588, filed Mar. 21, 2016, the entire contents of each of which is incorporated herein by reference.

BACKGROUND

Field

The present disclosure relates to an electronic vaping or e-vaping device configured to deliver a pre-vapor formulation to a vaporizer.

Description of Related Art

An electronic vaping device includes a heater element which vaporizes a pre-vapor formulation to produce a "vapor." The heater element may include a resistive heater coil, with a wick extending there through.

SUMMARY

At least one example embodiment relates to an electronic vaping device.

In some example embodiments, the electronic vaping device includes a housing extending in a longitudinal direction, the housing having a tip end and a mouth-end, the tip end being closed and the mouth-end having an opening therein, a planar heater contained in the housing, a heater support configured to support the planar heater, a tank containing a pre-vapor formulation, the tank configured to slide into and out of the opening of the mouth-end of the housing, and a wick extending from the tank. The wick is configured to be in contact with the planar heater when the tank is inserted in the housing.

In some example embodiments, the electronic vaping device includes a mouth-end insert configured to be inserted in the mouth-end of the housing. The mouth-end insert includes at least one outlet.

In some example embodiments, the electronic vaping device includes a stop on an inner surface of the housing, the stop configured to substantially prevent the tank from being inserted too far into the housing.

In some example embodiments, the housing is unitary. The wick is formed of cellulose. The wick is monolithic. The tank includes one or more ribs running longitudinally along an outer surface of the tank.

In some example embodiments, the planar heater includes a patterned layer of platinum disposed on a ceramic layer of material. The patterned layer of platinum is configured to be in electrical communication with a power supply through leads electrically connected to the patterned layer of platinum. The power supply is configured to supply power to the patterned layer of platinum so as to resistively heat the patterned layer of platinum such that the heater may reach a temperature sufficient to vaporize the pre-vapor formulation. The patterned layer of platinum has a resistivity of about 1 to 6 ohms. The leads are formed from platinum coated nickel wire. The heater is in the shape of a polyhedron having a square, triangular, diamond or rectangular shaped base with rounded or sharp corners. The heater may have a square or rectangular base wherein a length and width of the heater are each about 1.5 mm to about 4 mm and a thickness of the heater is about 0.2 mm to about 0.8 mm.

In some example embodiments, a glass layer of material may be disposed on the ceramic layer such that the patterned layer of platinum is between the ceramic layer and the glass layer. The ceramic layer is a first ceramic layer, and a second ceramic layer is disposed on the first ceramic layer such that the patterned layer of platinum is between the first ceramic layer and the second ceramic layer. The ceramic layer is formed from alumina, titania, zirconia, yttria, or yttria-stabilized zirconia. The patterned layer of platinum is about 0.5 micron to about 2 microns thick and has a width ranging from about 1 micron to about 100 microns.

In at least one example embodiment, the patterned layer of platinum has a sinuous pattern. In other example embodiments, the patterned layer of platinum has a U-shaped pattern.

In some example embodiments, the patterned layer of platinum includes first conductors, second conductors, and at least two heater portions arranged in parallel between the first and second conductors. The heater portions have a higher resistivity than the first and second conductors.

In some example embodiments, the heater includes a first patterned layer of platinum which has a higher resistivity than a second patterned layer of platinum. The first patterned layer of platinum is configured to be in electrical communication with the power source through a first set of leads and the second layer of platinum is configured to be in electrical communication with the power source through a second set of leads.

In some example embodiments, the first patterned layer of platinum is sinuous and the second patterned layer of platinum is U-shaped.

In at least one example embodiment, the ceramic layer of material includes at least one groove in a surface thereof. The groove is configured to direct a flow of the pre-vapor formulation from the wick toward a portion of the heater which reaches a temperature sufficient to vaporize pre-vapor formulation.

In some example embodiments, the ceramic layer of material includes at least one through-hole extending through a thickness of the ceramic layer. The at least one through-hole exposes portions of the patterned layer of platinum. The through-hole is configured to direct a flow of the pre-vapor formulation from the wick toward a portion of the heater. The ceramic layer of material is porous. The ceramic layer of material may include at least one bump. The bump is configured to direct a flow of the pre-vapor formulation from the wick toward a portion of the heater.

In some example embodiments, the patterned layer of platinum includes first and second conductors and a heater portion arranged between the first and second conductors. The first and second conductors each have a thickness of about 20 microns and the heater portion has a thickness of about 2 microns. The patterned layer of platinum may include a gold coating on an outer surface thereof. The patterned layer of platinum may be configured to concentrate heat at a tip thereof. The tip of the heater is thermally isolated from the remainder of the heater. The electronic vaping device has a uniform diameter of less than about 10 mm.

In some example embodiments, the electronic vaping device includes control circuitry including a sensor. The sensor is configured to sense a change in pressure. The electronic vaping device may also include at least one light emitting diode at the tip end.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
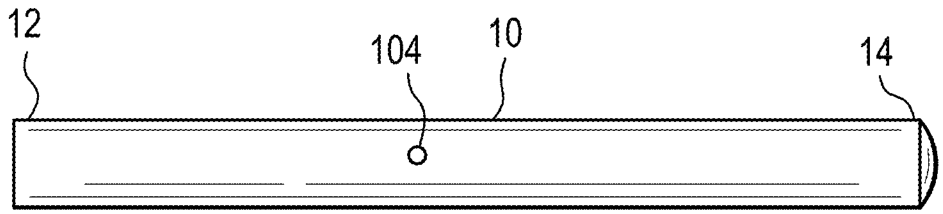
FIG. 1 is a side view of an electronic vaping device according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
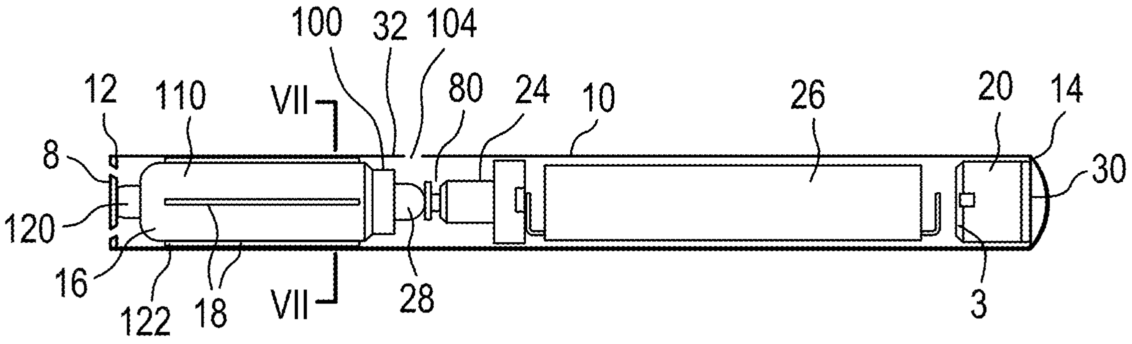
FIG. 2 is an illustration of an electronic vaping device having a transparent housing.

In at least one example embodiment, as shown in FIGS. 1-2, an electronic vaping device 10 has a mouth-end 12 and a tip end 14. An outer housing 32 extends in a longitudinal direction from the mouth-end 12 to the tip end 14. The mouth-end 12 may include an opening 5 therein.

The outer housing 32 may have a generally cylindrical cross-section. In other example embodiments, the outer housing 32 may have a generally triangular cross-section or square cross-section In some example embodiments, the housing 32 may have a greater circumference or dimensions at the tip end 14 than at a mouth-end 12 of the electronic vaping device 10 or vice versa. In at least one example embodiment, the housing 32 is a single, unitary housing. In other example embodiments, the housing 32 may include two or more pieces.

In some example embodiments, as shown in FIG. 2, the electronic vaping device 10 includes a mouth-end insert 8 configured to be inserted in the opening 5 of the mouth-end 12 of the housing 32. The mouth-end insert 8 may include at least one outlet.

As shown in FIG. 2, in at least one example embodiment, the housing 32 contains a tank 16. The tank 16 contains a pre-vapor formulation and has an opening 113 at an upstream end 100. A wick 28 extends from the upstream end 100 of the tank 16.

Figure 3:
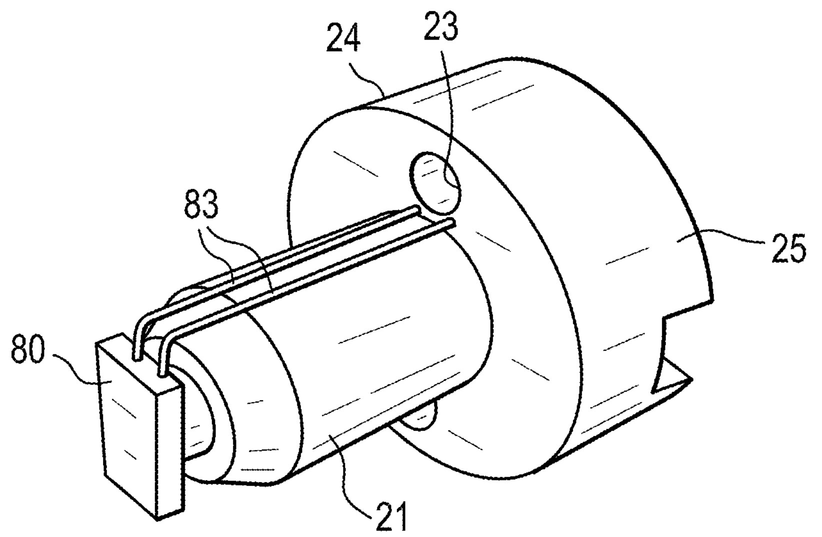
FIG. 3 is perspective view of a heater and support according to at least one example embodiment.
Figure 4:
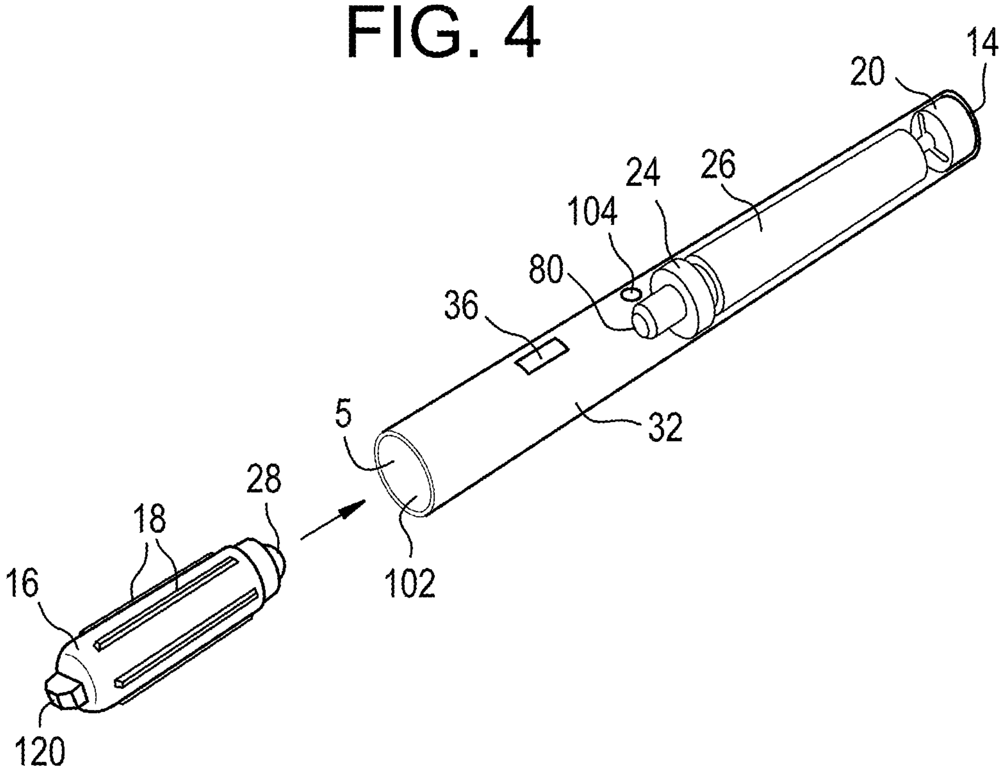
FIG. 4 is an illustration of a tank being inserted into a mouth-end of an electronic vaping device according to at least one example embodiment.

In at least one example embodiment, when the tank 16 is inserted in the housing 32, the wick 28 contacts a heater 80 that is supported by a support 24 (shown in FIGS. 2-3). As shown in FIGS. 3-4, electrical leads 83 electrically connect the heater 80 with a power supply 26 and control circuitry 20.

In some example embodiments, the control circuitry 20 may include a sensor 3, such as a sensor, such as a negative-pressure sensor and/or a microelectromechanical (MEMS) sensor. At least one light emitting diode (LED) 30 (shown in FIG. 2) may be positioned at the tip end 14, such that the LED 30 lights up when the electronic vaping device 10 is being recharged and/or vaped.

The pre-vapor formulation contained in the tank 16 may be a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

Figure 5:
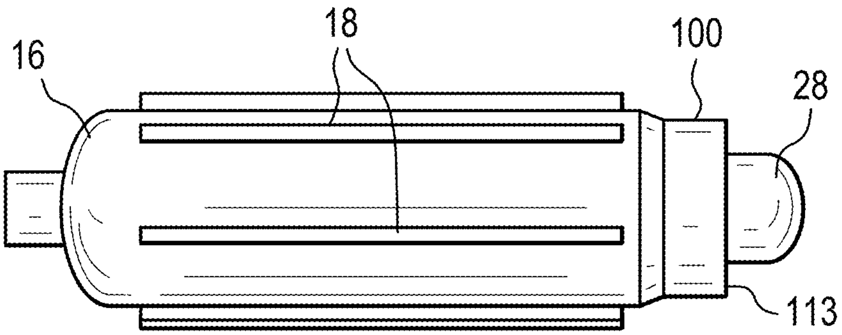
FIG. 5 is an enlarged view of a tank according to some example embodiments.
Figure 6:
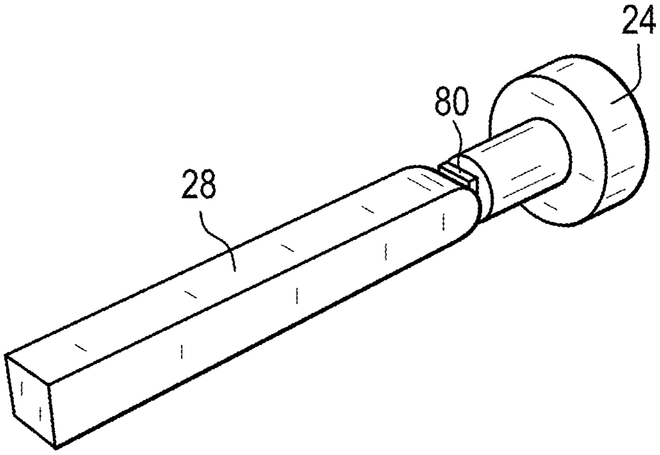
FIG. 6 is an enlarged view of a wick in contact with a heater according to at least one example embodiment.

In at least one example embodiment, as shown in FIGS. 5-6, the wick 28 is a monolithic body formed of cellulose. Since cellulose swells in contact with the pre-vapor formulation, the wick 28 also seals the opening 113 in the tank 16 so as to substantially prevent and/or reduce leakage of the pre-vapor formulation from the tank 16 during storage and/or vaping.

Moreover, since the wick 28 seals the opening 113 of the tank 16, the pre-vapor formulation does not contact the heater 80. Since the heater 80 includes metal, substantially preventing the pre-vapor formulation from contacting the heater 80 during storage may prevent and/or abate chemical reactions between the metal and the pre-vapor formulation that may cause the pre-vapor formulation to be unstable.

In some example embodiments, the tank 16 may include a plurality of ribs 18 running longitudinally along an outer surface 110 of the tank 16. The ribs 18 space remaining portions of the tank 16 from an inner surface 102 of the outer housing 32, such that air may flow along the tank 16 between the tank 16 and the inner surface 102 of the outer housing 32 during vaping. Air may be drawn into the electronic vaping device 10 via one or more air inlets 104 located upstream of the tank 16.

The tank 16 may be removable and replaceable once the pre-vapor formulation is depleted. To insert the tank, as shown in FIG. 4, the tank 16 may be pushed into the mouth-end 12 of the housing 32. To facilitate removal of the tank 16 from the housing 32, a grip 120 may be formed on a downstream end 122 of the tank 16.

In at least one example embodiment, the tank 16 is formed of a plastic and/or glass. Suitable plastics include polyethylene terephthalate, polyethylene, polyester, cyclic olefin copolymer, nylon, and polypropylene. The use of plastics and/or glass to form the tank 16 aids in maintaining the stability of the pre-vapor formulation because the pre-vapor formulation is substantially prevented from contacting and/or reacting with metals.

Moreover, since the pre-vapor formulation is contained in the tank 16 located downstream of the heater 80, electrical leads 83 do not extend through the tank 16 and do not contact the pre-vapor formulation to further prevent and/or abate reaction of the pre-vapor formulation with any metals.

Figure 7:
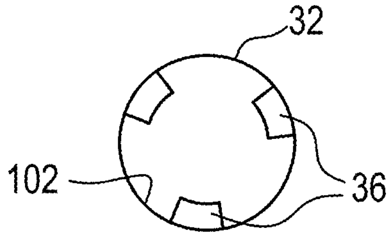
FIG. 7 is a cross-sectional view of an outer housing along line VII-VII of FIG. 2 according to at least one example embodiment.

As shown in FIGS. 4 and 7, in at least one example embodiment, at least one stop 36 may be formed on the inner surface 102 of the outer housing 32. The at least one stop 36 may be a ridge or bump on the inner surface 102. The at least one stop 36 is configured to substantially prevent insertion of the tank 16 too far into the outer housing 32, so as to substantially avoid and/or mitigate damage to the heater 80. The at least one stop 36 is positioned so that that after insertion of the tank 16 in the housing 32, the ribs 18 abut the stop 36 and the wick 28 contacts the heater 80.

In at least one example embodiment, as shown in FIG. 3, the support 24 includes a disc-shaped body 25 that friction fits with the inner surface 102 of the outer housing 32. The disc-shaped body 25 may form a seal with the inner surface 102 of the outer housing 32. A tubular body 21 extends downstream from the disc-shaped body 25, such that the support 24 is generally T-shaped in cross-section. The tubular body 21 supports the heater 80 so as to reduce bending and/or breaking of the heater 80 during insertion of the tank 16 and/or during shipping and/or vaping. The electrical leads 83 extend from the heater 80, along the tubular body 21 and through one or more openings 23 in the disc-shaped body 25.

In at least one example embodiment, the electrical leads 83 connect the heater 80 to the power supply 26 and the control circuitry 20.

In at least one example embodiment, as shown in FIGS. 2 and 4, the power supply 26 may include a battery arranged in the electronic vaping device 10. The power supply 26 may be a Lithium-ion battery or one of its variants, for example a Lithium-ion polymer battery. Alternatively, the power supply 26 may be a nickel-metal hydride battery, a nickel cadmium battery, a lithium-manganese battery, a lithium-cobalt battery or a fuel cell. The electronic vaping device 10 may be usable by an adult vaper until the energy in the power supply 26 is depleted or in the case of lithium polymer battery, a minimum voltage cut-off level is achieved.

Further, the power supply 26 may be rechargeable and may include circuitry configured to allow the battery to be chargeable by an external charging device. To recharge the electronic vaping device 10, an USB charger or other suitable charger assembly may be used.

Further, the control circuit 20 may supply power to the heater 80 responsive to the sensor. In one example embodiment, the control circuit 20 may include a maximum, time-period limiter. In another example embodiment, the control circuit 20 may include a manually operable switch.

The time-period of the electric current supply to the heater 80 may be pre-set depending on the amount of pre-vapor formulation desired to be vaporized. In yet another example embodiment, the control circuit 20 may supply power to the heater 80 as long as the sensor 3 detects a pressure drop.

When activated, the heater 80 may heat a portion of the wick 28 for less than about 10 seconds. Thus, the power cycle may range in period from about 2 seconds to about 10 seconds (e.g., about 3 seconds to about 9 seconds, about 4 seconds to about 8 seconds or about 5 seconds to about 7 seconds).

In at least one example embodiment, as shown in FIGS. 2 and 3, the heater 80 is a planar heater that contacts at least a portion of the wick 28, but is not intertwined or wrapped around the wick 28.

Manufacture of the electronic vaping device 10 is simple and may be automated since the heater 80 and wick 28 need not be intertwined. Moreover, since the tank 16 is removable, the overall structure of the electronic vaping device 10 is simpler and includes fewer parts as compared to electronic vaping devices having an annular reservoir and a coil heater wrapped around a wick.

Figure 8A:
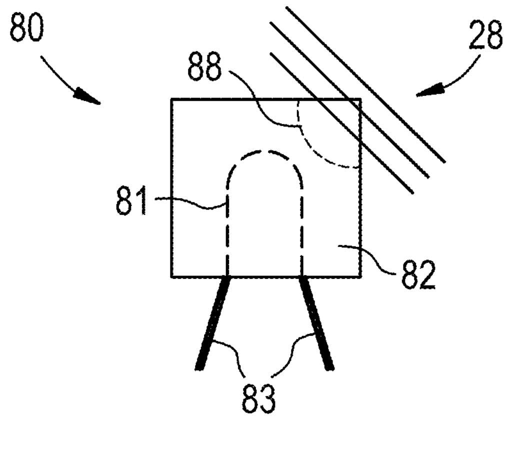
FIGS. 8A and 8B are cross-sectional views of a heater of an electronic vaping device according to at least one example embodiment.
Figure 8B:
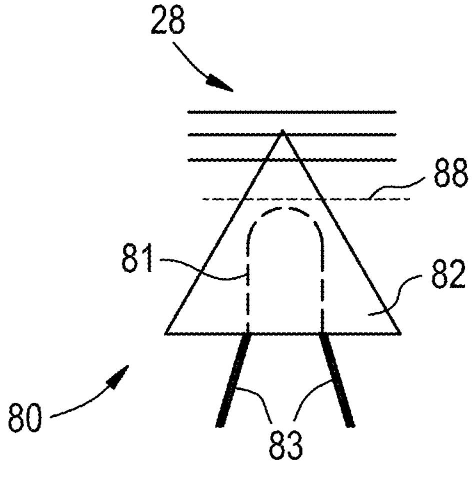

FIGS. 8A and 8B each illustrate at least one example embodiment of the heater 80 according to some example embodiments. As shown, the heater 80 may include a patterned layer of platinum 81 disposed on a ceramic layer 82 of material. Electrical leads (leads) 83 are electrically connected to the patterned layer of platinum 81 such that the patterned layer of platinum 81 may be electrically connected to the power source (not shown).

In at least one example embodiment, the ceramic layer 82 may be formed from alumina, titania, zirconia, yttria, or yttria-stabilized zirconia or other suitable material. The ceramic layer of material 82 may be porous such that the pre-vapor formulation may be absorbed by the ceramic layer of material 82.

In some example embodiments, the patterned layer of platinum 81 may include impurities therein or may be a platinum alloy. In an example embodiment, the patterned layer of platinum 81 may include a gold coating on an outer surface thereof.

In at least one example embodiment, the ceramic layer 82 is alumina and the patterned layer of platinum 81 is formed from platinum having a purity of 99% or greater. In at least one example embodiment, the layer of platinum 81 may include a platinum alloy including up to 20% rhodium so as to achieve a lower temperature coefficient of resistance. The patterned layer of platinum 81 may have a temperature coefficient of about 0.0005 to about 0.005 per degree Celsius at about 20° C. The leads 83 may be formed from platinum coated nickel wire, nickel wire, Nichrome wire, and/or stainless steel wire.

In at least one example embodiment, the resistance of the patterned layer of platinum 81 may be about 1 ohm to about 6 ohms at room temperature, such that the resistance of the patterned layer of platinum 81 increases as the temperature of the patterned layer of platinum 81 increases. The heater 80 is self-regulating against overdriving or overheating because as the patterned layer of platinum 81 of the heater 80 increases in temperature, the platinum forming the patterned layer increases in resistivity, which tends to lower the heating rate of the patterned layer of platinum 81 when a constant voltage is supplied across the patterned layer of platinum 81.

For a constant voltage, the effect of a decrease in resistance will increase the power supplied to the patterned layer of platinum 81 as $P=V^2/R$ wherein P stands for power, V stands for voltage, and R stands for resistance. For example, the resistance of the patterned layer of platinum 81 decreases when the temperature of the patterned layer of platinum 81 decreases. In at least one example embodiment, where the thermal load is what is being heated, decreasing the load may increase the heater temperature and raise the resistance. When the resistance of the patterned layer of platinum decreases (which tends to in and of itself decrease resistive heating), the power supplied through the patterned layer of platinum 81 will increase, which increases resistive heating and thereby causes the heater 80 to be self-regulating. In addition, the current and voltage may be measured by the device to determine the heater temperature.

Figure 9:
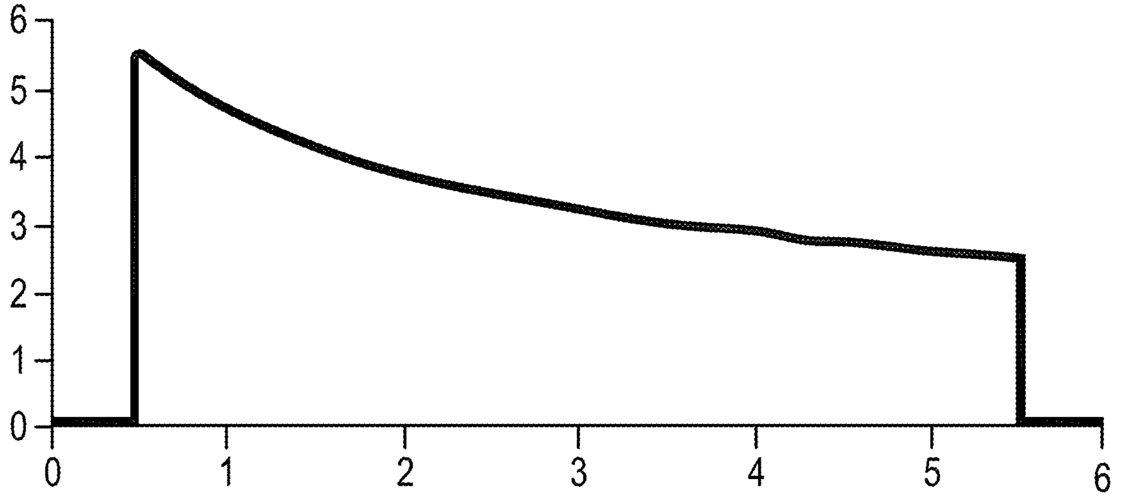
FIG. 9 is a power supply graph for a heater.

As shown in FIG. 9, an amount of power supplied in Watts (y-axis) to a patterned layer of platinum 81 of the heater 80 is measured against the amount of time in seconds (x-axis) the power is supplied to the patterned layer of platinum 81. In this example embodiment, voltage is supplied across the patterned layer of platinum 81 at a constant level of about 3.7 volts for a heating period of about 5 seconds. The patterned layer of platinum 81 initially has a resistance of about 2.5 ohms at a temperature of about 25° C. (room temperature). The power supply is turned on at about 0.5 seconds wherein the low initial resistance of the patterned layer of platinum 81 results in a rapid initial application of power (about 5.5 Watts) to the patterned layer of platinum 81 such that the patterned layer of platinum 81 is rapidly heated. As time progresses, and the patterned layer of platinum 81 increases in resistance, less power is supplied thereto. For example, just before the power supply is turned off at about 5.5 seconds, only about 3 Watts of power is supplied to the patterned layer of platinum 81. At this point, the temperature of the patterned layer of platinum 81 has increased to about 337° C. and the resistance of the patterned layer of platinum has increased to about 5.5 ohms.

As shown in the graph shown in FIG. 9, more power is drawn during the beginning portion of the heating period than at the end portion of the heating period. Thus, the initial application of power may rapidly enhance vapor generation by quickly increasing the temperature of the patterned layer of platinum 81, while power supplied to the patterned layer of platinum 81 is reduced as the temperature of the patterned layer of platinum 81 increases. Therefore, power is saved as the resistance of the patterned layer of platinum increases. The reduction in power requirements may increase the battery life of the power supply 26, and may also allow for power sources with reduced battery capacity or size to be included in the power supply 26 of the electronic vaping device 10.

In at least one example embodiment, the heater 80 is arranged to contact the wick 28, such that the heater 80 may vaporize the pre-vapor formulation through conduction and/or convection.

In another example embodiment, the heater 80 may be in the shape of a polyhedron, and for example may have a rectangular-shaped, diamond-shaped, or triangular-shaped base, or square shaped base. Corners of the polyhedron may be rounded or sharp. In an example embodiment, the polyhedron shaped heater 80 may have a square or rectangular base wherein a length and width of the heater are each about 1.5 mm to about 3 mm and a thickness of the heater is about 0.4 mm to about 0.8 mm.

As illustrated in FIG. 8A, the heater 80 may have a square-shaped base wherein a corner of the heater 80 is arranged to contact the wick 28.

As illustrated in FIG. 8B, the heater 80 may have a triangular-shaped base wherein a corner of the heater 80 is arranged to contact the wick 28.

In at least one example embodiment, the heater 80 contacts the wick 28 such that boundaries 88 are formed there between. The boundaries 88, as shown in FIGS. 8A and 8B, are the portions of the heater 80 that may become wetted with pre-vapor formulation, which may be vaporized by the heater 80. Thus, by placing the heater 80 in contact with the wick 28, vapor may be formed from the pre-vapor formulation vaporized at the boundary 88 thereof when the patterned layer of platinum 81 is supplied power by the power source (not shown).

FIGS. 10A-10D each illustrates an example embodiment of the heater 80, which may be included in the electronic vaping device 10. In some example embodiments, as shown in FIGS. 10A-10D, the heater 80 includes the patterned layer of platinum 81 disposed on a ceramic layer 82 of material.

Figure 10A:
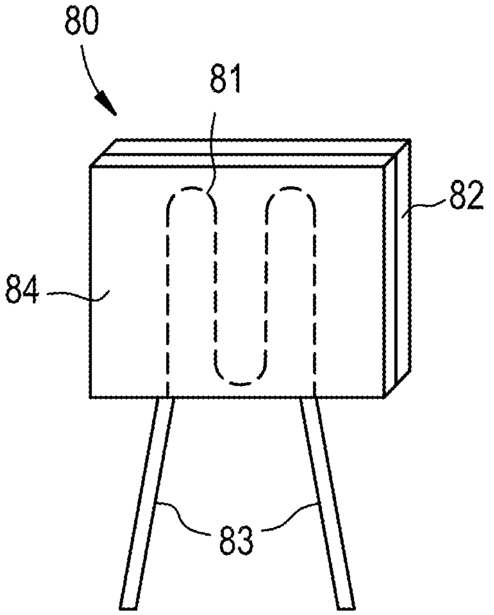
FIGS. 10A-10D are cross-sectional views of a heater of an electronic vaping device.
Figure 10B:
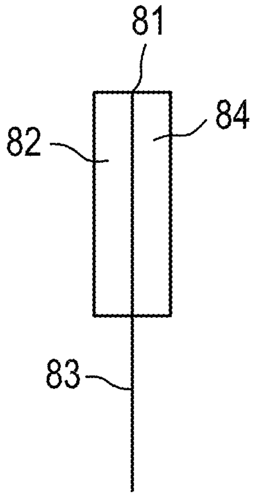

As shown in FIGS. 10A and 10B, a glass layer 84 of material may be disposed on the ceramic layer 82 wherein the patterned layer of platinum 81 is between the ceramic layer 84 and the glass layer 84.

In another example embodiment, the ceramic layer 82 is a first ceramic layer, and a second ceramic layer is disposed on the first ceramic layer, such that the patterned layer of platinum 81 is between the first ceramic layer and the second ceramic layer. The leads 83 are electrically connected to the patterned layer of platinum 81, such that the patterned layer of platinum 81 may be electrically connected to the power supply 26.

Figure 10C:
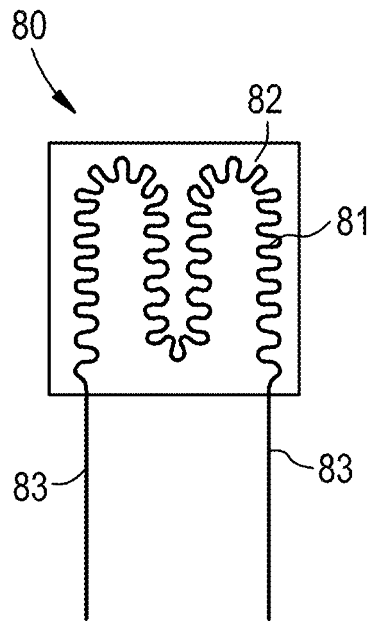
Figure 10D:
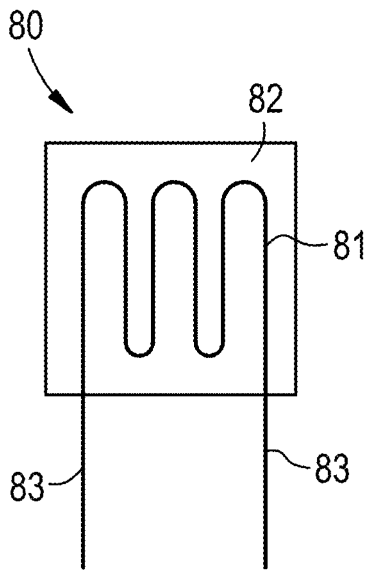

In at least one example embodiment, as shown in FIGS. 10A, 10C, and 10D, the patterned layer of platinum 81 may have a sinuous pattern. By increasing the number of turns of the sinuous pattern, and by reducing the spacing between turns of the sinuous pattern, the resistance of the patterned layer of platinum 81 may be increased. Thus, for the same material, the patterned layers of platinum 81, as shown in FIGS. 10C and 10D, will have a greater resistance than the patterned layer of platinum 81 as shown in FIG. 10A because the patterned layers as shown in FIGS. 10C and 10D have closer spacing and more turns than the patterned layer as shown in FIG. 10A.

FIGS. 11A-11D each illustrates an example embodiment of the heater 80, which may be included in an electronic vaping device 10.

As shown in FIGS. 11A-11D, the patterned layer of platinum 81 may be disposed on the ceramic layer 82 in a generally U-shaped pattern, and the electrical leads 83 are electrically connected to the patterned layer of platinum 81.

Figure 11A:
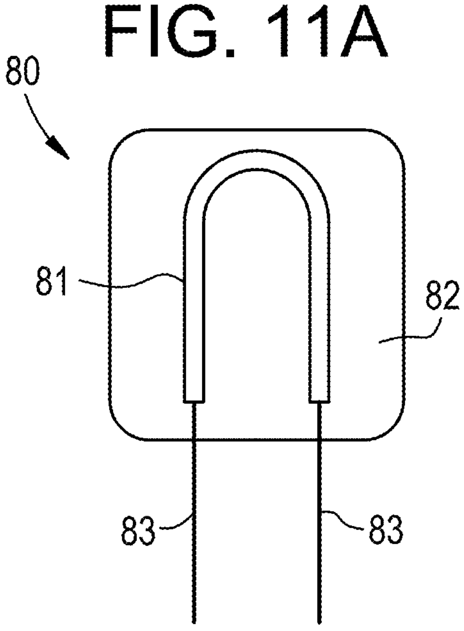
FIGS. 11A-11D are cross-sectional views of a heater of an electronic vaping device.

As illustrated in FIG. 11A, the patterned layer of platinum 81 is generally U-shaped and the patterned layer of platinum 81 is disposed on ceramic layer 82 so as to evenly heat the heater 80 when power is supplied to the patterned layer of platinum 81 by the power source.

In at least one example embodiment, the patterned layer of platinum 81 may be arranged so as to control the portion of the heater 80, which generates the greatest amount of heat. By controlling the portion of the heater 80 which generates the greatest amount of heat, the heater 80 may be arranged to contact or partially contact the wick 28 at the portion of the heater 80 which generates the greatest amount of heat. Thus, the portion of the heater 80 which generates the greatest amount of heat may be arranged to be the portion of the heater 80 which becomes wetted by pre-vapor formulation delivered thereto by the wick. In this manner, the power required to vaporize the pre-vapor formulation delivered to the heater 80 may be reduced, the voltage across the patterned layer of platinum required to sufficiently heat the patterned layer of platinum 81 may be reduced, or the length of time that power is supplied to the patterned layer of platinum 81 may be reduced.

Figure 11B:
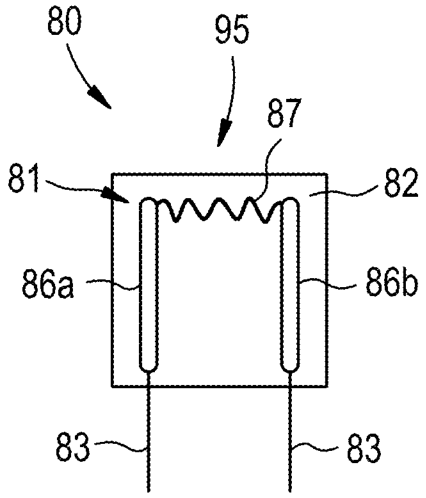

In one example embodiment, as illustrated in FIG. 11B, the patterned layer of platinum 81 may be generally U-shaped. The U-shaped layer of platinum 81 includes first and second conductor portions 86*a*, 86*b*, and a heater portion 87 extending between the first and second conductor portions 86*a*, 86*b* along an upper edge 95 of the heater 80. Since the conductor portions 86*a*, 86*b* have a lower resistivity than the heater portion 87, power may be supplied to the patterned layer of platinum 81 such that a greater amount of heat is generated along the upper edge 95 of the heater 80 than the remainder of the heater 80. Thus, the upper edge 95 of the heater 80 may be arranged to contact the wick wherein less power is required to vaporize pre-vapor formulation along the upper edge 95 of the heater 80 than if the heater 80 were to be evenly heated. In an example embodiment, the conductor portions 86*a*, 86*b* may have a thickness of about 20 microns and the heater portion 87 may have a thickness of about 0.5 micron to about 2 microns. The conductor portions 86*a*, 86*b* and the heater portion 87 may each have a width of about 1 micron to about 100 microns.

Figure 11C:
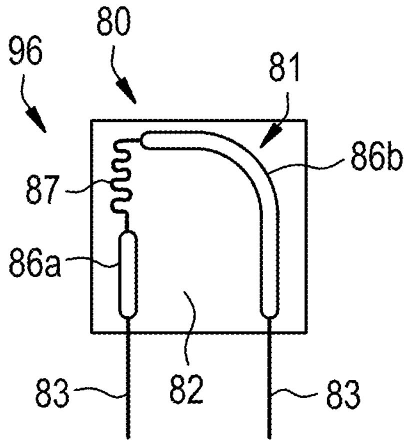

In some example embodiments, as illustrated in FIG. 11C, the heater portion 87 may extend between the first and second conductor portions 86*a*, 86*b* along a corner 96 of the heater 80. The heater portion 87 has a higher resistance than the first and second conductor portions 86*a*, 86*b*. Power may be supplied to the patterned layer of platinum 81, such that the greatest amount of heat is generated at a corner 96 of the heater 80. Thus, the corner 96 of the heater 80 may be arranged to contact the wick 28 wherein less power is required to vaporize pre-vapor formulation at the corner 96 of the heater 80 than if the heater 80 were to be evenly heated.

Figure 11D:
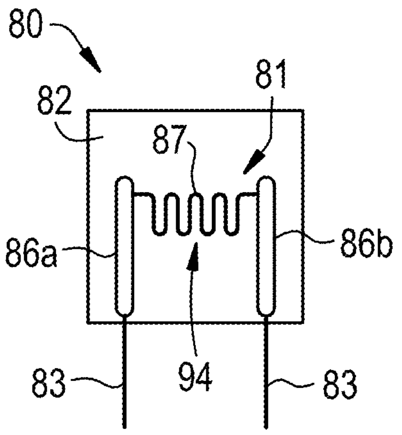

As illustrated in FIG. 11D, in another example embodiment, the heater portion 87 may extend between the first and second conductor portions 86*a*, 86*b* at a central region 94 of the heater 80 wherein the heater portion 87 has a higher resistance than the first and second conductor portions 86*a*, 86*b*. The greatest amount of heat is generated at the central region 94 of the heater 80. Thus, the wick 28 may be arranged to extend across the central region 94 of the heater 80 wherein less power is required to vaporize pre-vapor formulation at the central region 94 of the heater 80 than if the heater 80 were to be evenly heated.

Figure 12A:
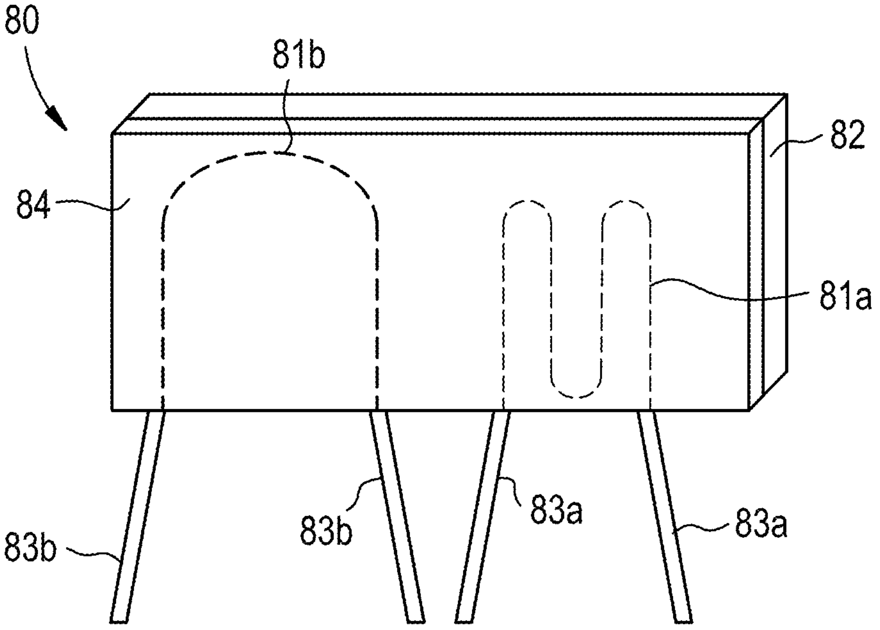
FIGS. 12A-12B are cross-sectional views of a heater of an electronic vaping device.
Figure 12B:
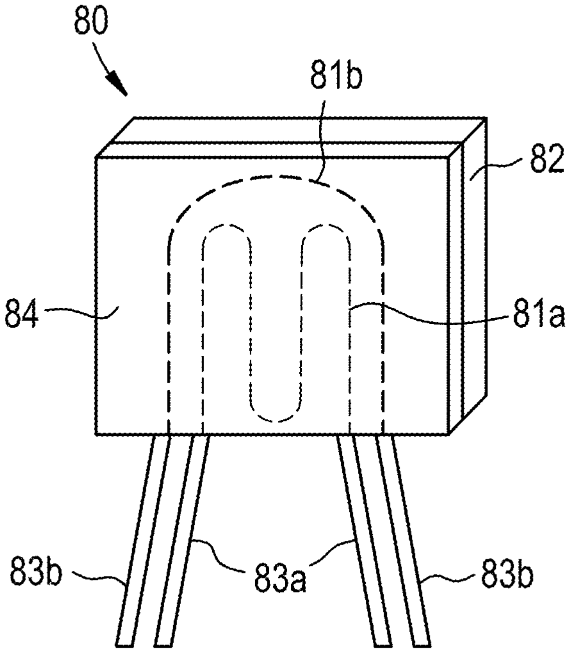

FIGS. 12A-12B each illustrates an example embodiment of a heater 80, which may be included in an electronic vaping device 10.

As shown in FIGS. 12A-12B, the heater 80 includes a first patterned layer of platinum 81*a* disposed on a ceramic layer 82 of material and a second patterned layer of platinum 81*b* disposed on the ceramic layer 82. The first patterned layer 81*a* and the second patterned layer 81*b* may be side by side as shown in FIG. 12A. In at least one example embodiment, as shown in FIG. 12B, the first patterned layer 81*a* may be nested within the second patterned layer 81*b*. A glass layer 84 of material may be disposed on the ceramic layer 82. The first and second patterned layers of platinum 81*a*, 81*b* may be between the ceramic layer 82 and the glass layer 82. Alternatively, the glass layer 84 may be formed from a ceramic material as opposed to a glass material. Leads 83*a* are electrically connected to the first patterned layer of platinum 81*a* such that the first patterned layer of platinum 81*a* may be electrically connected to a power source (not shown). Leads 83*b* are electrically connected to the second patterned layer of platinum 81*b* such that the patterned layer of platinum 81*b* may be electrically connected to the power supply. The first patterned layer of platinum 81*a* may have a lower room temperature resistance than the second patterned layer of platinum 81*b*, such that when power is supplied from the power source to the first and second patterned layers of platinum 81*a*, 81*b*, the first patterned layer of platinum 81*a* may cause the heater 80 to quickly rise in temperature while the second patterned layer of platinum 81*b* may cause the heater 80 to achieve higher overall temperatures.

Figure 13A:
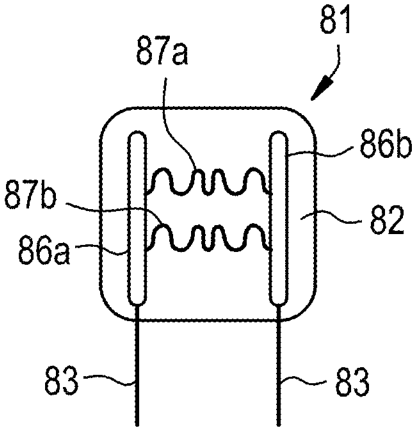
FIGS. 13A-13B are cross-sectional views of a heater of an electronic vaping device.
Figure 13B:
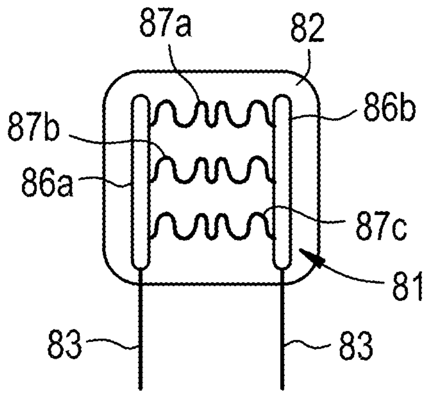

FIGS. 13A-13B each illustrates an example embodiment of a heater 80 which may be included in an electronic vaping device 10 as disclosed herein.

As shown in FIG. 13A, the patterned layer of platinum 81 includes first and second conductor portions 86*a*, 86*b* and a first heater portion 87*a* and a second heater portion 87*b* arranged in parallel between the first and second conductor portions 86*a*, 86*b*.

As shown in FIG. 13B, the patterned layer of platinum 81 includes first and second conductor portions 86*a,b* and a first heater portion 87*a*, a second heater portion 87*b*, and a third heater portion 87*c* arranged in parallel between the first and second conductor portions 86*a*, 86*b*. In alternate embodiments, more than three heater portions may be arranged in parallel between the first and second conductors 86*a*, 86*b*.

By arranging the heater portions in parallel, heat generation may be controlled such that portions of the heater 80 which become wetted by pre-vapor formulation drawn there toward are heated faster than surrounding portions of the heater. For example, if a portion of the heater 80 overlying the first heater portion 87*a* becomes wetted by pre-vapor formulation, the thermal load of the pre-vapor formulation will cause a drop in resistivity of the first heater portion 87*a*. As the resistance of the first heater portion 87*a* drops, more power will be supplied to the first heater portion 87*a*, thereby causing the first heater portion 87*a* to increase in temperature and thus increase the rate of vaporization at the portion of the heater 80 overlying the first heater portion 87*a*. In this manner, the heater 80 may direct heat to portions thereof with greater thermal load thereby increasing the efficiency of vaporization of pre-vapor formulation delivered thereto.

Figure 14A:
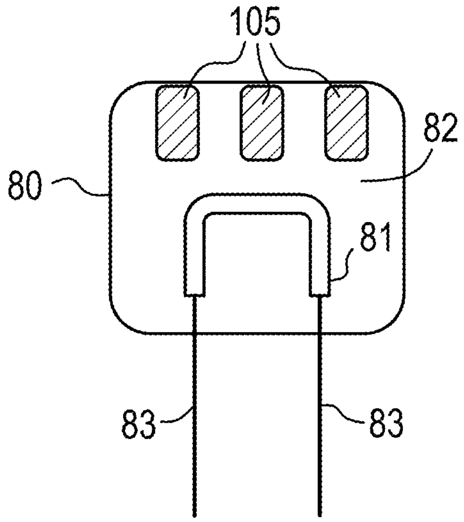
FIGS. 14A-14C are cross-sectional views of a heater of an electronic vaping device.
Figure 14B:
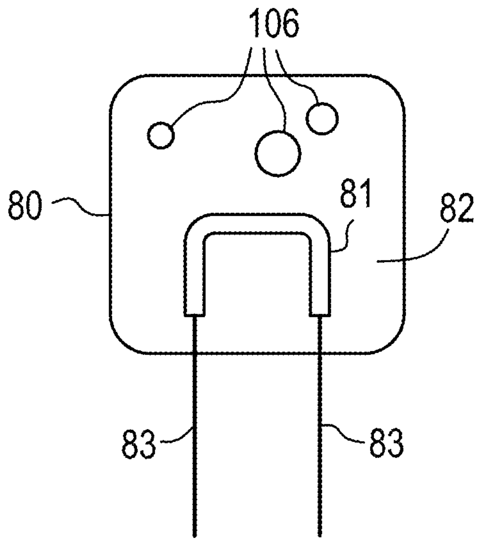
Figure 14C:
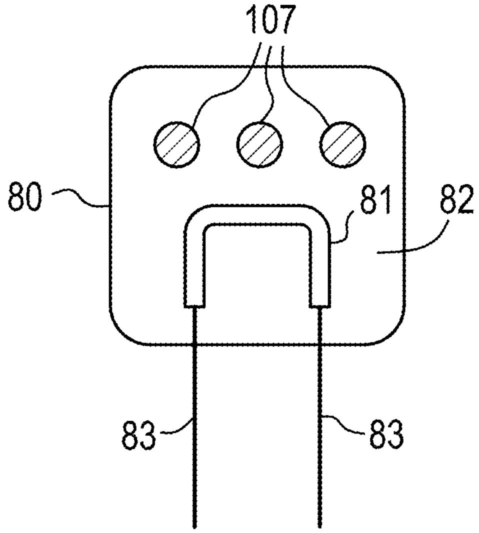

Referring to FIGS. 14A-14C, the ceramic layer of material 82 may include one or more grooves 105, bumps 106, and/or through-holes 107 which are arranged to direct a flow of pre-vapor formulation from the wick toward a portion of the heater 80 that is arranged to reach a temperature sufficient to vaporize the pre-vapor formulation drawn there toward when the patterned layer of platinum is resistively heated.

In some example embodiments, as shown in FIG. 14A, one or more grooves 105 may be arranged to direct the flow of the pre-vapor formulation over a surface of the heater 80 wherein the pre-vapor formulation may fill the grooves 105 and flow toward a portion of the heater 80 that is arranged to reach a temperature to vaporize the pre-vapor formulation and then be vaporized upon reaching that portion.

In another example embodiment, as shown in FIG. 14B, one or more bumps 106 which are arranged to direct the flow of pre-vapor formulation over a surface of the heater 80 to reach a temperature sufficient to vaporize the pre-vapor formulation drawn there toward when the patterned layer of platinum is resistively heated.

In at least one embodiment, as shown in FIG. 14C, the ceramic layer of material 82 may include through-holes 107, which are arranged to extend through the ceramic layer of material 82. The through-holes 107 may optionally expose portions of the patterned layer of platinum and wherein the through-holes 107 are arranged to direct the flow of pre-vapor formulation over a surface of the heater 80 wherein the pre-vapor formulation may enter a through hole 107 and thereby be vaporized by the patterned layer of platinum 81 when the patterned layer of platinum is heated.

In some example embodiments, the heater 80 may be a magnetic heater as described in U.S. non-provisional application Ser. No. 14/882,665 filed Oct. 15, 2015, the entire contents of which is incorporated herein in its entirety by reference thereto.

In other example embodiments, the heater 80 may be any heater that is configured to vaporize a pre-vapor formulation without being intertwined with a wick. Thus, the heater 80 may be any planar heater.

In at least one example embodiment, the heater may be a thin film ceramic heater including a thin film of an oxidation resistant conductor on a ceramic, such as alumina in contact with a wick.

In at least one example embodiment, the heater may include a thin film ceramic heater shaped like a cylinder or tube.

In at least one example embodiment, the heater may be a nickel-chromium wire wrapped around a ceramic cylinder, tube, disc, square, or rectangle. In this example embodiment, the heater may be supported by leads.

In at least one example embodiment, the heater may be a nickel-chromium wire wrapped around a ceramic or glass wick. In this example embodiment, the heater may be supported by leads.

In at least one example embodiment, the electrical resistance of the heater is about 2 to about 10 ohms. In at least one example embodiment, the maximum linear dimension of the heater ranges from about 5 mm to about 10 mm and the volume ranges from about 1 $mm^3$ to about 10 $mm^3$.

In an example embodiment, the electronic vaping device 10 may be about 80 mm to about 110 mm long and about 7 mm to about 8 mm in diameter. For example, in one example embodiment, the e-vaping device may be about 84 mm long and may have a diameter of about 7.8 mm.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

I claim:

1. An electronic vaping device comprising:

a housing extending in a longitudinal direction, the housing having a tip end and a mouth-end, the tip end being closed and the mouth-end having an opening therein; and a tank containing a formulation, the tank configured to slide into and out of the opening of the mouth-end of the housing, the tank including, two or more ribs on an outer surface of the tank, the two or more ribs extending longitudinally along the outer surface of the tank, the two or more ribs configured to space the outer surface of the tank from an inner surface of the housing so as to define a flow passage between the outer surface of the tank and the inner surface of the housing.

2. The electronic vaping device of claim 1, further comprising:

a mouth-end insert configured to be inserted in the mouth-end of the housing.

3. The electronic vaping device of claim 2, wherein the mouth-end insert includes at least one outlet.

4. The electronic vaping device of claim 1, wherein the housing is unitary.

5. The electronic vaping device of claim 1, further comprising:

a wick extending from the tank.

6. The electronic vaping device of claim 5, wherein the wick is monolithic.

7. The electronic vaping device of claim 1, further comprising:

a planar heater in the housing.

8. The electronic vaping device of claim 7, further comprising:

a heater support configured to support the planar heater.

9. The electronic vaping device of claim 7, wherein the planar heater comprises:

a patterned layer of platinum on a ceramic layer, the patterned layer of platinum being configured to be in electrical communication with a power supply through leads electrically connected to the patterned layer of platinum.

10. The electronic vaping device of claim 9, wherein the power supply is configured to supply power to the patterned layer of platinum so as to resistively heat the patterned layer of platinum such that the planar heater may reach a temperature sufficient to vaporize the formulation.

11. The electronic vaping device of claim 9, wherein the patterned layer of platinum has a resistivity of 1 to 6 ohms.

12. The electronic vaping device of claim 9, wherein the leads are formed from platinum coated nickel wire.

13. The electronic vaping device of claim 9, wherein the planar heater is in a shape of a polyhedron having a square, triangular, diamond or rectangular shaped base with rounded or sharp corners.

14. The electronic vaping device of claim 9, wherein the planar heater has a square or rectangular base, a length and a width of the planar heater are each 1.5 mm to 4 mm, and a thickness of the planar heater is 0.2 mm to 0.8 mm.

15. The electronic vaping device of claim 9, wherein a glass layer is on the ceramic layer such that the patterned layer of platinum is between the ceramic layer and the glass layer.

16. The electronic vaping device of claim 9, wherein the ceramic layer is a first ceramic layer, and a second ceramic layer is on the first ceramic layer such that the patterned layer of platinum is between the first ceramic layer and the second ceramic layer.

17. The electronic vaping device of claim 9, wherein the ceramic layer is formed from alumina, titania, zirconia, yttria, yttria-stabilized zirconia, or any combination thereof.

18. The electronic vaping device of claim 9, wherein the patterned layer of platinum is 0.5 micron to 2 microns thick, and the patterned layer has a width ranging from 1 micron to 100 microns.

19. The electronic vaping device of claim 9, wherein the patterned layer of platinum has a sinuous pattern.

20. The electronic vaping device of claim 9, wherein the patterned layer of platinum has a U-shaped pattern.

* * * * *